US009021709B2

(12) United States Patent
Oliver et al.

(10) Patent No.: US 9,021,709 B2
(45) Date of Patent: May 5, 2015

(54) ELECTRONIC DEVICE MAGNETIC INTERFERENCE INDICATION METHOD

(71) Applicant: Research In Motion Limited, Waterloo (CA)

(72) Inventors: Robert George Oliver, Waterloo (CA); Adam Louis Parco, Kitchener (CA); Christopher James Grant, Waterloo (CA)

(73) Assignee: Blackberry Limited, Waterloo (CA)

( * ) Notice: Subject to any disclaimer, the term of this patent is extended or adjusted under 35 U.S.C. 154(b) by 238 days.

(21) Appl. No.: 13/675,947

(22) Filed: Nov. 13, 2012

(65) Prior Publication Data
US 2014/0130361 A1     May 15, 2014

(51) Int. Cl.
*G01C 17/38* (2006.01)
*G01C 17/28* (2006.01)

(52) U.S. Cl.
CPC ............... *G01C 17/28* (2013.01); *G01C 17/38* (2013.01)

(58) Field of Classification Search
CPC .................................................. G01C 17/38
USPC ........................................................ 33/356
See application file for complete search history.

(56) References Cited

U.S. PATENT DOCUMENTS

| 6,009,629 | A * | 1/2000 | Gnepf et al. ..................... 33/357 |
| 6,760,678 | B1 * | 7/2004 | Hon et al. ......................... 702/92 |
| 7,353,614 | B2 * | 4/2008 | Parks et al. ...................... 33/356 |
| 8,061,049 | B2 * | 11/2011 | Mayor et al. .................... 33/356 |
| 8,370,097 | B2 * | 2/2013 | Patel et al. ....................... 702/92 |
| 8,494,799 | B2 * | 7/2013 | Piemonte et al. ............... 702/92 |
| 2005/0114024 | A1 * | 5/2005 | Benham et al. ............... 701/224 |
| 2007/0077940 | A1 * | 4/2007 | Mamo ......................... 455/456.1 |
| 2010/0307015 | A1 * | 12/2010 | Mayor et al. .................... 33/303 |
| 2011/0090244 | A1 * | 4/2011 | Pantfoerder .................. 345/619 |
| 2013/0200882 | A1 * | 8/2013 | Almalki et al. ............... 324/202 |

FOREIGN PATENT DOCUMENTS

JP     2004-286613 A    10/2004
WO    2008/026330 A1   3/2008

OTHER PUBLICATIONS

Extended European Search Report dated May 6, 2013, issued from the corresponding EP patent application No. 12192354.4.

* cited by examiner

*Primary Examiner* — Christopher Fulton
(74) *Attorney, Agent, or Firm* — Lesley M. Morrison; Borden Ladner Gervais LLP

(57) ABSTRACT

A method of indicating an interference magnetic field at an electronic device includes: displaying a first arrow indicating a direction of magnetic north on a display of the electronic device, the direction of the first arrow corrected to remove interference caused by an interference magnetic field; and displaying a second arrow indicating a direction of a source of the interference magnetic field on a display of the electronic device.

20 Claims, 6 Drawing Sheets

UNITED STATES PATENT

ELECTRONIC DEVICE MAGNETIC INTERFERENCE INDICATION METHOD

TECHNICAL FIELD

The present application relates to interference magnetic field indication using an electronic compass.

BACKGROUND DISCUSSION

Electronic devices, including portable electronic devices, have gained widespread use and can provide a wide variety of functions. Some devices include an electronic compass for providing directional assistance to a user.

Electronic compasses obtain a measurement of the magnetic field that is present at the electronic device. The measurement includes a contribution by the Earth's magnetic field as well as an interference magnetic field, which is generated by magnetic components present in the local environment of the electronic device. Different calibration methods are available to remove the contribution by the interference magnetic field so that the electronic compass may provide a generally accurate indication of magnetic north.

BRIEF DESCRIPTION OF THE DRAWINGS

Embodiments of the present application will now be described, by way of example only, with reference to the attached Figures, wherein.

DETAILED DESCRIPTION

Figure 1:
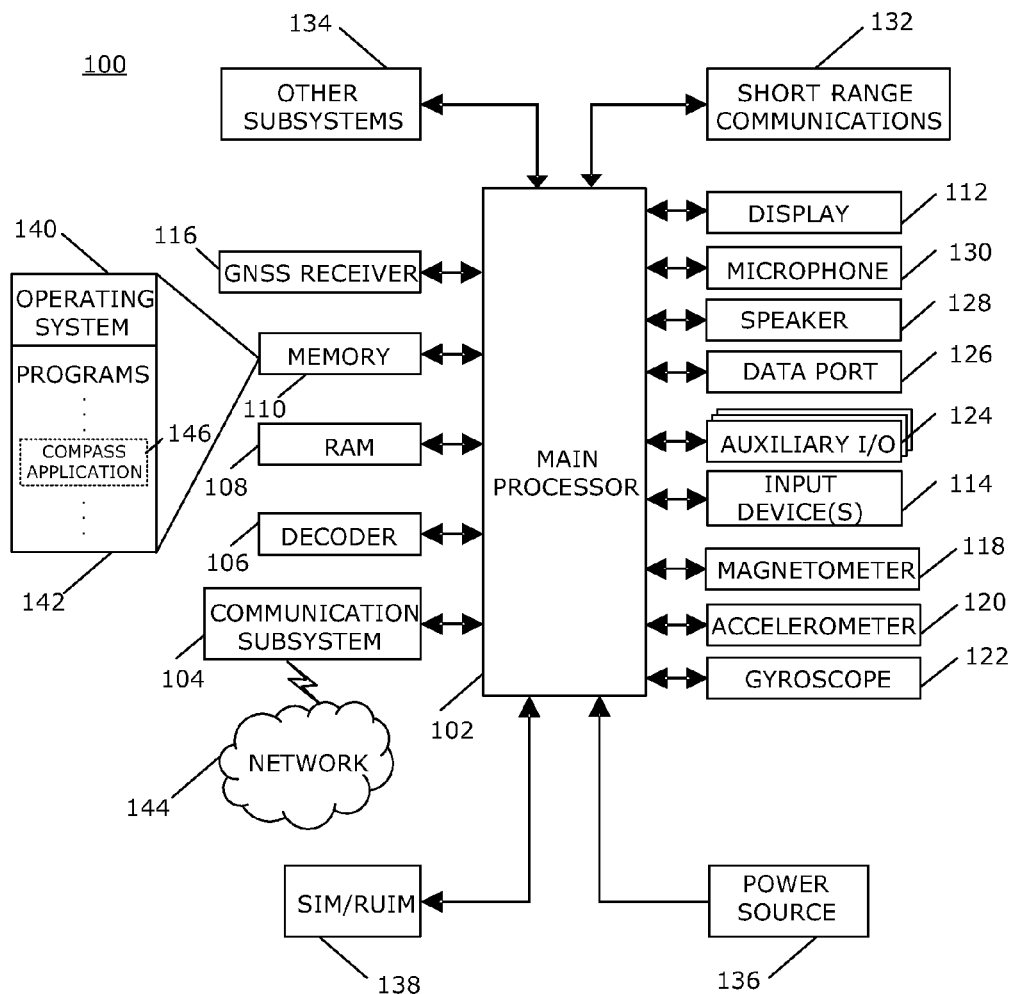
FIG. 1 is a simplified block diagram of one example of an electronic device in accordance with the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In an aspect of the present disclosure there is provided a method of indicating an interference magnetic field at an electronic device including: displaying a first arrow indicating a direction of magnetic north on a display of the electronic device, the direction of the first arrow corrected to remove interference caused by an interference magnetic field; and displaying a second arrow indicating a direction of a source of the interference magnetic field on a display of the electronic device.

In another aspect of the present disclosure there is provided an electronic device, including: a magnetometer for generating magnetic north data based on a location of the electronic device; an accelerometer for generating orientation data based on an orientation of the electronic device; a memory for storing corrected magnetic north data and interference direction data, the corrected magnetic north data and the interference direction data calculated using the magnetic north data, the orientation data and Earth's magnetic field data associated with the location of the electronic device, the corrected magnetic north data corrected to remove interference caused by an interference magnetic field; a display; and a processor in communication with the magnetometer, the accelerometer and the display, the processor for rendering a first arrow and a second arrow on the display of the electronic device, the first arrow indicating a direction of magnetic north and the second arrow indicating a direction of a source of the interference magnetic field.

The disclosure generally relates to an electronic compass or an electronic device including an electronic compass application. In the embodiments described herein, the electronic device is a portable electronic device. Examples of portable electronic devices include mobile, or handheld, wireless communication devices such as pagers, cellular phones, cellular smart-phones, wireless organizers, personal digital assistants, tablet computers, wirelessly enabled notebook computers, and so forth. The portable electronic device may also be a portable electronic device without wireless communication capabilities.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 144. The wireless network 144 may be any type of wireless network, including, but not limited to, data wireless networks, voice wireless networks, and networks that support both voice and data communications. A power source 136, such as one or more rechargeable batteries or a port to an external power supply, powers the portable electronic device 100.

The processor 102 interacts with other components, such as Random Access Memory (RAM) 108, memory 110, a display 112, an auxiliary input/output (I/O) subsystem 124, a data port 126, a speaker 128, a microphone 130, short-range communications 132, and other device subsystems 134. Information, such as text, characters, symbols, images, icons, and other items that may be displayed or rendered on a portable electronic device, is displayed on the display 112 via the processor 102.

To identify a subscriber for network access, the portable electronic device 100 uses a Subscriber Identity Module or a Removable User Identity Module (SIM/RUIM) card 138 for communication with a network, such as the wireless network 144. Alternatively, user identification information may be programmed into memory 110.

The portable electronic device 100 includes an operating system 140 and software programs or components 142 that are executed by the processor 102 and are typically stored in a persistent, updatable store such as the memory 110. Additional applications or programs may be loaded onto the portable electronic device 100 through the wireless network 144, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 144 through the communication subsystem 104. For voice communications, the overall operation of the portable electronic device 100 is similar. The speaker 128 outputs audible information converted from electrical signals, and the microphone 130 converts audible information into electrical signals for processing.

The display 112 may be an LCD display and input may be received via input device(s) 114. Examples of input devices 114 include: a keyboard, a track pad, a touch pad or one or more buttons. A single input device 114 or any combination of input devices 114 may be used. Alternatively, the display 112 may be a touch-sensitive display, such as a capacitive touch-sensitive display or a resistive touch-sensitive display, for example. A capacitive touch-sensitive display may include a capacitive touch-sensitive overlay operably connected to an electronic controller, which communicates with processor 102. One or more touches, also known as touch contacts or touch events, may be detected by the touch-sensitive display. The processor 102 may determine attributes of the touch, including a location of a touch. The touch-sensitive display may also be configured to detect a gesture. A gesture, such as a swipe, is a type of touch that begins at an origin point and continues to a finishing point while touch contact is maintained. A touches and gestures may be detected from any suitable object, such as a finger, thumb, appendage, or other items, for example, a stylus, pen, or other pointer, depending on the nature of the touch-sensitive display.

An electronic compass application 146 is a software program that is stored in memory 110 and executed by the processor 102. The electronic compass application 146 may use any method to determine a direction of magnetic north relative to the portable electronic device 100. The methods may use Earth's magnetic field data, magnetic north data generated by a magnetometer 118 and orientation data generated by an accelerometer 120 and/or a gyroscope 122.

When a corrected direction of magnetic north relative to the portable electronic device 100 has been determined, it is possible to then determine a magnitude and direction of an interference magnetic field relative to the portable electronic device 100. The interference magnetic field may be determined by comparing the corrected direction of magnetic north with uncorrected magnetometer data, for example.

In some methods, the Earth's magnetic field data at a location of the portable electronic device 100 may be retrieved from a model, such as the World Magnetic Model (WMM), for example. Models may be stored locally or accessed wirelessly. The location of the portable electronic device 100 may be determined using a GNSS (Global Navigation Satellite System) receiver 116, such as a GPS (Global Positioning System) receiver; using proximity information from cellular base stations or Wireless Network access points; or using input from a user, for example. In order to rotate the Earth's magnetic field determined using the model onto a frame of reference of the portable electronic device 100, data from a magnetometer 118, an accelerometer 120 and/or a gyroscope 122 may be used. Alternatively, the Earth's magnetic field data may be determined by the electronic device 100 based on previously generated magnetic north data. The previously generated magnetic north data may have been received at a location at which the portable electronic device 100 determined there was little or no interference.

Figure 2:
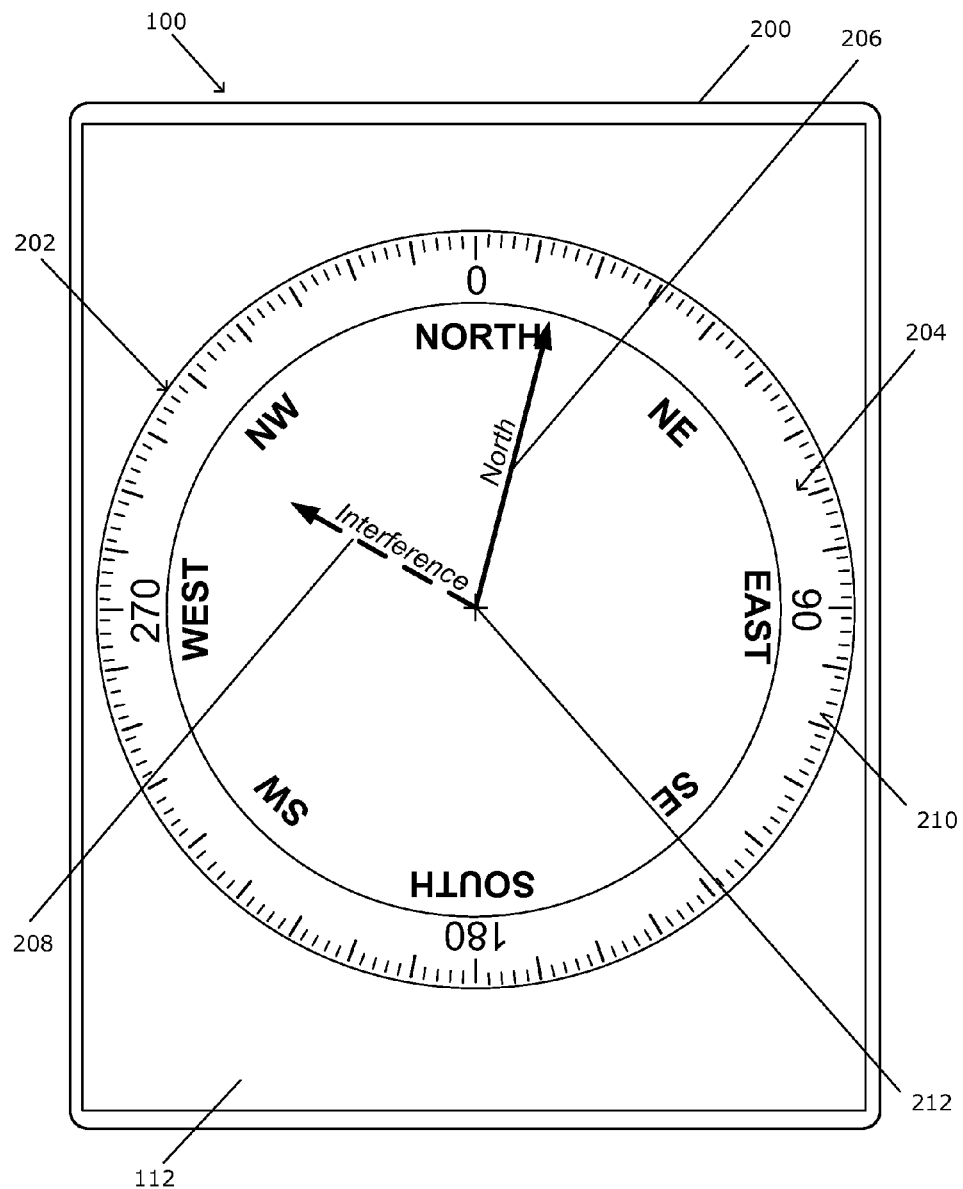
FIG. 2 is a front view of a display of an example electronic device in accordance with the disclosure.
Figure 3:
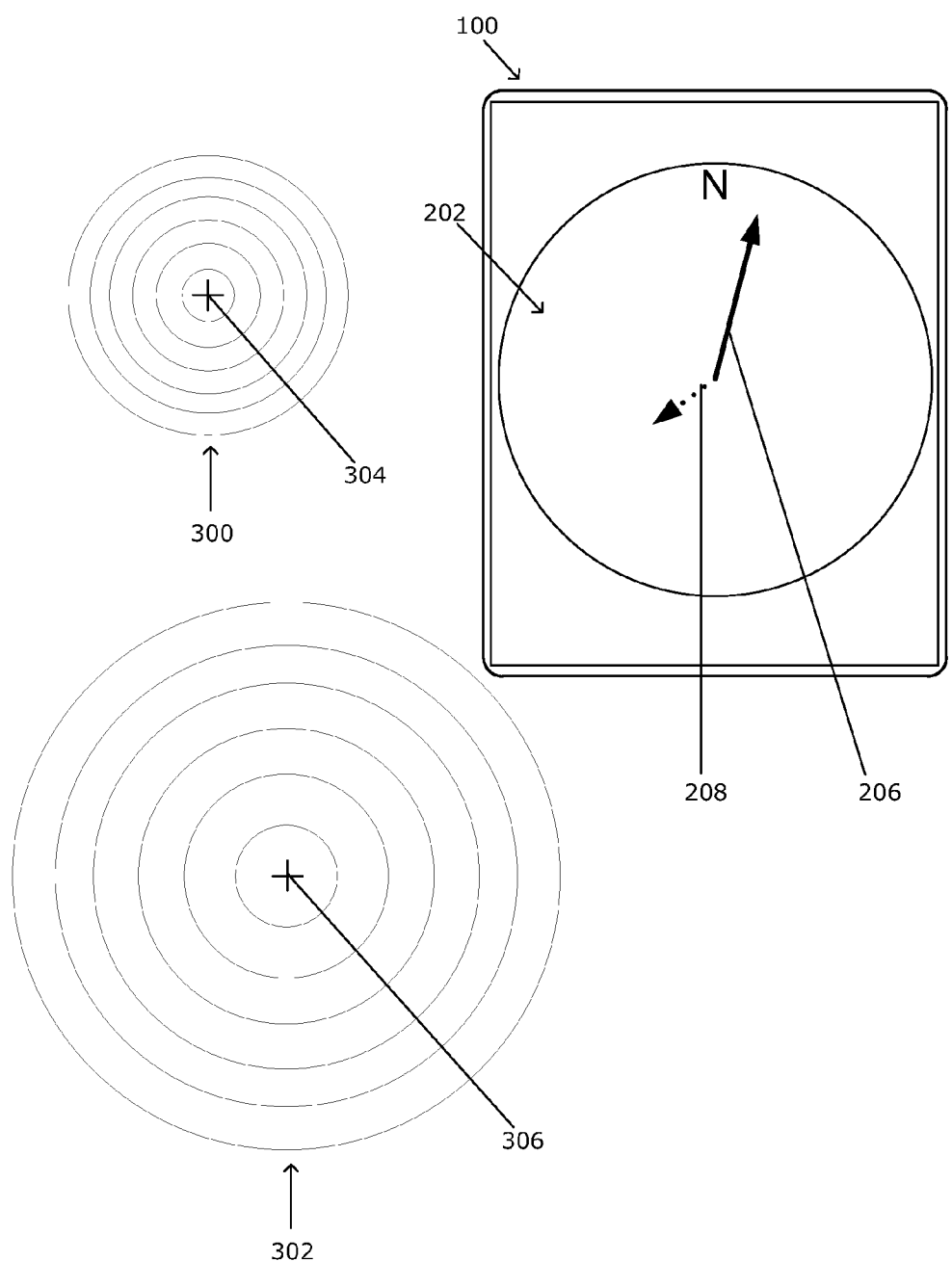
FIG. 3 is a front view of a display of an example electronic device in an example environment in accordance with the disclosure.

A front view of an example of a portable electronic device 100 is shown in FIG. 2. The portable electronic device 100 includes a housing 200 that houses the internal components that are shown in FIG. 1 and frames the display 112, which is a touch-sensitive display. In the example of FIG. 2, a virtual compass 202 is displayed. The virtual compass 202 includes a frame of reference 204 including cardinal directions: North, South, East and West, intermediate directions: NW, NE, SE and SW and a virtual dial 210 including increments between 0 and 360 degrees. A first arrow 206 and a second arrow 208 extend from a virtual pivot point 212. The first arrow 206 simulates a compass needle of a physical compass and is continually directed toward an estimate of magnetic north. The second arrow 208 is directed toward a source of an interference magnetic field. When more than one interference magnetic field is present, the source of the interference magnetic field toward which the second arrow 208 is directed is a location of a sum of the interference magnetic fields. For example, as shown in FIG. 3, the arrow 208 is directed toward the location of the sum of a first interference magnetic field 300 and a second interference magnetic field 302. As will be understood by a person skilled in the art, the sum is located between a source 304 of the first interference magnetic field 300 a source 306 of the second interference magnetic field 302. The location of the sum is closer to the source 306 of the second interference magnetic field 302 because the second interference magnetic field 302 is stronger that the first interference magnetic field 302 in the example of FIG. 3.

Figure 4:
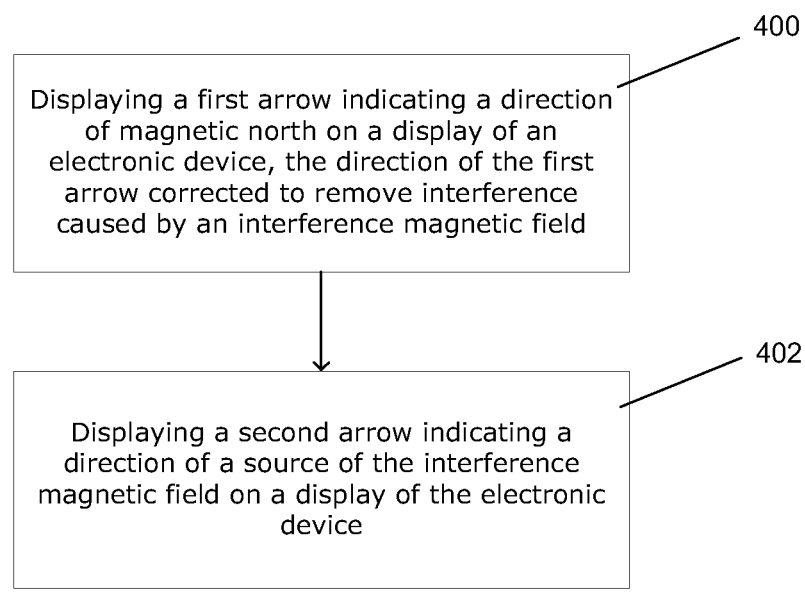
FIG. 4 is a flow chart illustrating a method of indicating an interference magnetic field at an electronic device.

FIG. 4 is a flowchart illustrating an example of a method of indicating an interference magnetic field at the portable electronic device 100. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium.

At 400, the first arrow 206 is displayed on a display of the portable electronic device 100 to indicate a direction of magnetic north, the direction of the first arrow 206 corrected to remove interference caused by an interference magnetic field. Generally, interference is any non-north component of a detected magnetic field. At 402, the second arrow 208 is displayed on the display and directed toward a source of the interference magnetic field. The first and second arrows 206, 208 may be displayed simultaneously.

The first arrow 206 and second arrow 208 are rendered for display based on corrected magnetic north data and interference direction data determined by the compass application 146 using one or more of the methods described above. The corrected magnetic north data and the interference direction data are stored in memory 110 and used by the processor 102 to render images of the first arrow 206 and the second arrow 208 for display. The method of FIG. 4 may be repeated when there is a change in the interference magnetic field, at regular intervals or when an update virtual compass request is received at the processor 102 in response to user input, for example. As will be understood by a person skilled in the art, portions of the displayed image that are unchanged may be maintained and therefore may not be re-rendered for display.

Figure 5:
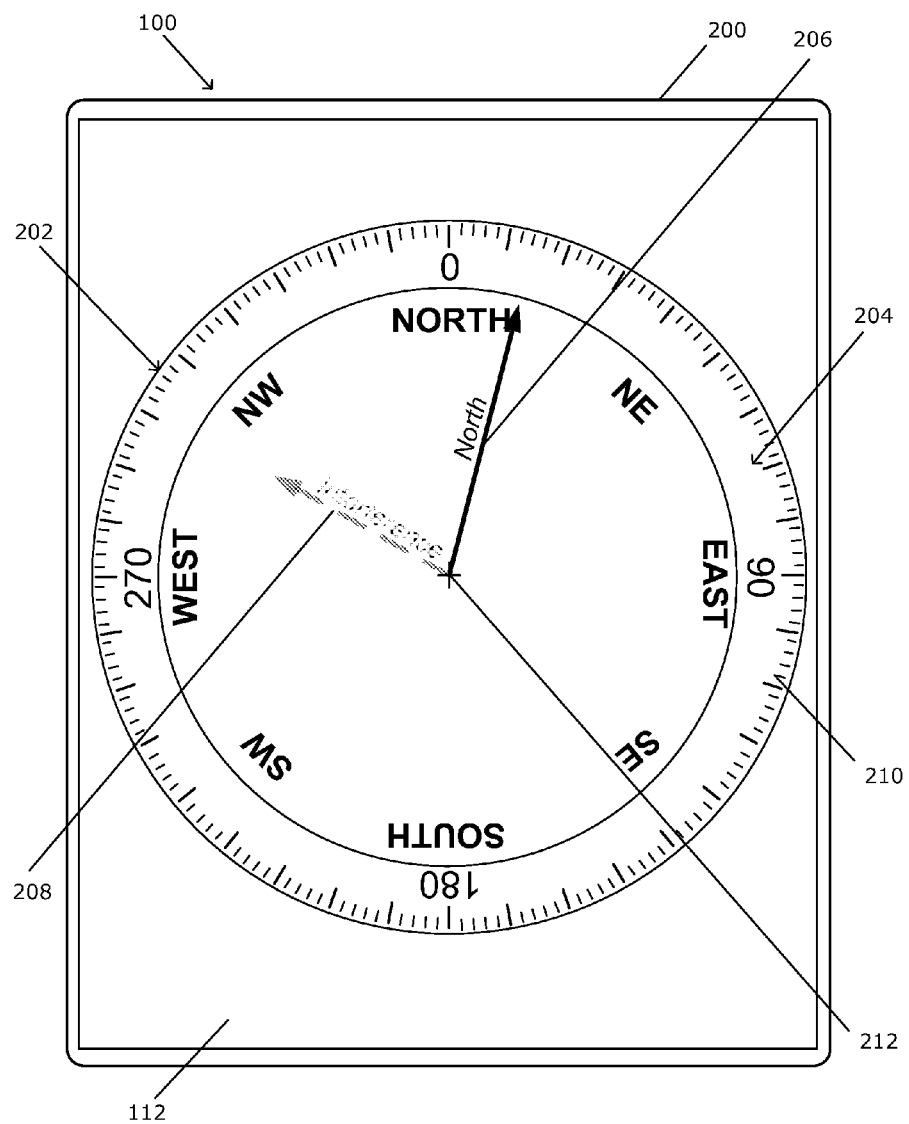
FIG. 5 is another front view of a display of an example electronic device in accordance with the disclosure.

The method of FIG. 4 provides the user with a virtual compass 202 further including the second arrow 208, which points toward a source of magnetic interference. In use, the user may, in response to display of the second arrow 208, move away from the source of the magnetic interference in order to decrease the magnitude of the interference magnetic field at the portable electronic device 100 and thereby increase the certainty of the direction of the first arrow 206. After the user who is carrying the portable electronic device 100 has moved in a direction opposite to the direction of the second arrow 208 of the virtual compass of FIG. 2, the second arrow 208 continues to be directed toward the source of magnetic interference, however, is greyed out to indicate that the interference magnetic field is weaker, as shown in FIG. 5. Because the second arrow 208 is now greyed out, the certainty of the first arrow 206 has, therefore, increased.

Referring back to FIG. 2, the arrows 206, 208 are provided with a different appearance in order to facilitate quick and easy identification thereof on the virtual compass 202. In FIG. 2, the first arrow 206 is a solid line and the second arrow 208 is a dashed line. In addition, the word "North" is displayed beside the first arrow 206 and the word "Interference" is displayed beside the second arrow 208. Any visual effects that facilitate easy differentiation between the arrows 206, 208 may be used. For example, the arrows 206, 208 may be displayed having different colours, different line weights or line patterns, different arrow shapes and/or may be shaded differently. The arrows 206, 208 are not limited to being arrow-shaped. Instead, cones, circles or other shapes may be used to indicate the direction of the direction of magnetic north and the direction of a source of the interference magnetic field. The shapes may originate at the virtual pivot point 212 or may be spaced therefrom.

The first arrow 206 may be a magnetic north vector having a magnitude that corresponds with a certainty of the magnetic north direction. Certainty of the magnetic north direction may be associated at least in part with a strength of an interference magnetic field that is determined using the magnetic field detected by the magnetometer 118 of the portable electronic device 100. For example, the first arrow 206 may be longer when the interference magnetic field is weak and shorter when the interference magnetic field is strong.

The second arrow 208 may be an interference vector having a magnitude that corresponds to the strength of the interference magnetic field. For example, the second arrow 208 may be longer when the interference magnetic field is strong and shorter when the interference magnetic field is weak.

In an example, magnitudes of the magnetic north vector and the interference vector are inversely related such that displayed lengths thereof change inversely in response to a change in the interference magnetic field strength. For example, when the strength the interference magnetic field strength increases, the length of the magnetic north vector decreases and the length of the interference vector increases. Conversely, when the strength the interference magnetic field strength decreases, the length of the magnetic north vector increases and the length of the interference vector decreases. The length of the vectors may change by the same amount or may change by different amounts.

In another example, other features of the displayed images of the first arrow 206 and the second arrow 208 such as colour, line weight and intensity, for example, may be inversely related such that the features change in opposition with one another in response to a change in the interference magnetic field strength. For example, when the strength the interference magnetic field strength increases, the brightness of the first arrow decreases and the brightness of the interference vector increases. Conversely, when the strength the interference magnetic field strength decreases, the brightness of the first arrow increases and the brightness of the second arrow decreases.

The virtual compass 202 may further provide a visual indication to inform a user when a certainty of the magnetic north vector is below a threshold and therefore should not be relied upon. For example, an "X" may be displayed on the first arrow 206 or the first arrow 206 may not be displayed and only the second arrow 208 may be displayed.

Figure 6:
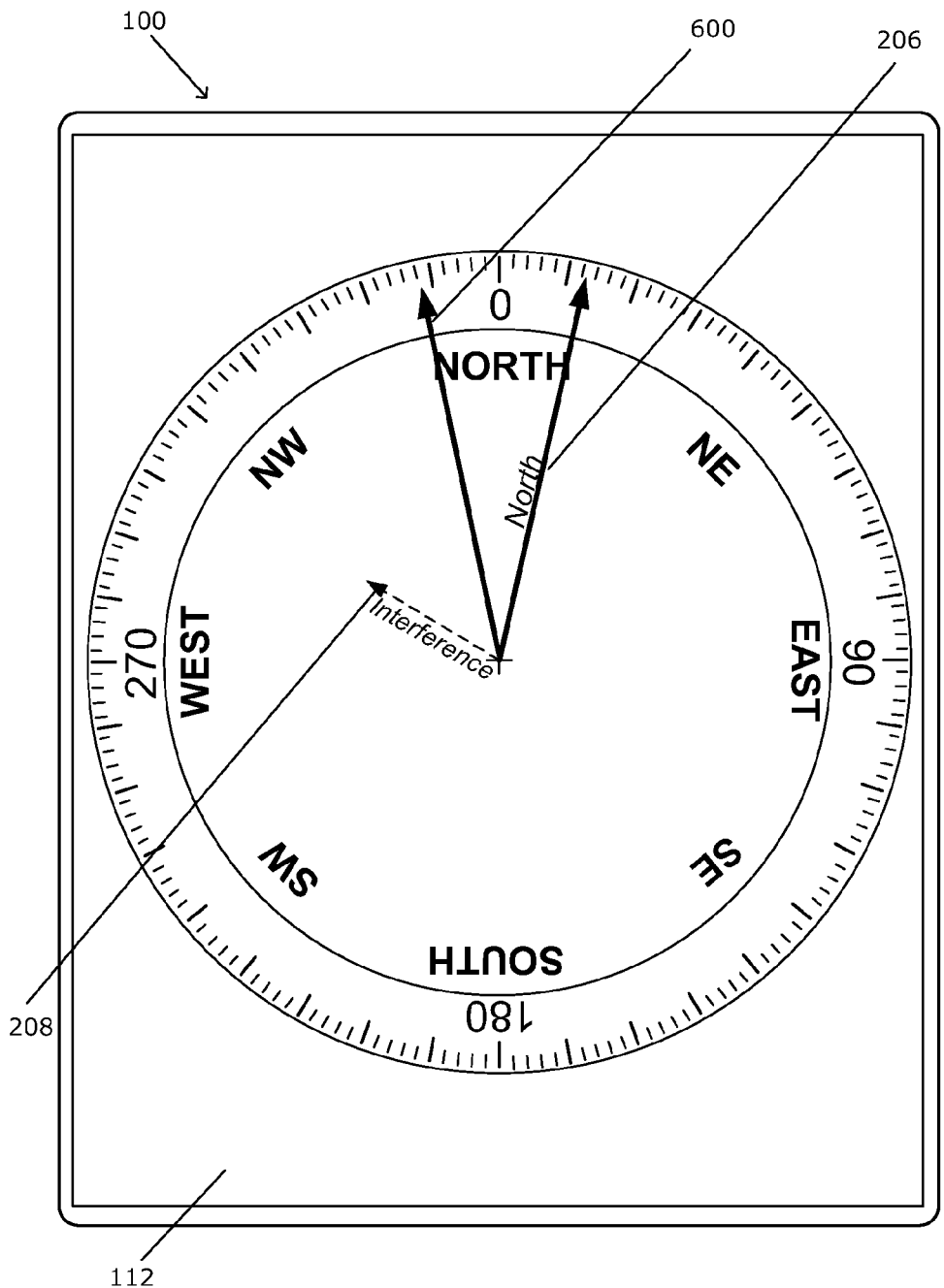
FIG. 6 is another front view of a display of an example electronic device in accordance with the disclosure.

In another example, which is shown in FIG. 6, a sum arrow 600, which is a vector sum of the magnetic north vector and the interference vector, is also displayed as part of the virtual compass 202 on the display 112. The magnetic sum arrow 600 provides the user of the virtual compass 202 with an indication of where the first arrow 206 would point if the first arrow was not corrected for the magnetic interference. Therefore, providing an indication of the direction that the magnetic north arrow of a conventional uncorrected compass would be oriented.

In another example, the first and second arrows 206, 208 indicate a direction in three dimensions relative to the electronic device 100 by including a direction component along an axis that is generally perpendicular to the display 112. Visual effects that are known in the art may be employed to provide a three-dimensional appearance for the arrows 206, 208.

Implementation of one or more embodiments may realize one or more advantages, some of which have been indicated already. The concepts described herein can be flexibly applied to a variety of electronic devices. The method and apparatus described herein provides logical feedback to the user as to the quality of the magnetic north estimate by showing how much interference has been determined to be present. Further, the method and apparatus allows the virtual compass to have more than one function. For example, in addition to magnetic north location, the virtual compass may also be used to locate sources of interference for use in metal detection or stud finding, for example.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A method of indicating an interference magnetic field at an electronic device comprising:
   generating, using a magnetometer of the electronic device, magnetic north data based on a detected magnetic field;
   storing, in a memory of the electronic device, corrected magnetic north data and interference direction data, the corrected magnetic north data and the interference direction data calculated using the magnetic north data, orientation data and Earth's magnetic field data associated with a location of the electronic device, the corrected magnetic north data corrected to remove non-north components of the detected magnetic field caused by an interference magnetic field;
   displaying a first arrow indicating a direction of magnetic north on a display of the electronic device, the direction of the first arrow determined based on the corrected magnetic north data; and
   displaying a second arrow indicating a direction of a source of the interference magnetic field on a display of the electronic device, the direction of the second arrow determined based on the interference direction data.

2. A method as claimed in claim 1, wherein the first arrow is a magnetic north vector having a length that corresponds to a certainty of a direction of magnetic north.

3. A method as claimed in claim 1, wherein the second arrow is an interference vector having a length that corresponds to a strength of the interference magnetic field.

4. A method as claimed in claim 1, wherein a change in strength of the interference magnetic field is indicated by modifying an appearance of the second arrow on the display.

5. A method as claimed in claim 1, wherein a change in certainty of a direction of magnetic north is indicated by modifying an appearance of the first arrow on the display.

6. A method as claimed in claim 1, wherein the first arrow is a magnetic north vector having a length that corresponds to a certainty of a direction of magnetic north, the second arrow is an interference vector having a length that corresponds to a strength of the interference magnetic field and an inverse relationship is provided between the magnetic north vector and the interference vector.

7. A method as claimed in claim 6, wherein when a strength of the interference magnetic field increases, a length of the interference vector increases and a length of the magnetic north vector decreases.

8. A method as claimed in claim 6, wherein when a strength of the interference magnetic field decreases, a length of the interference vector decreases and a length of the magnetic north vector increases.

9. A method as claimed in claim 1, wherein an inverse relationship is provided between features of displayed images of the first arrow and the second arrow.

10. A method as claimed in claim 1, comprising displaying a frame of reference of a virtual compass on the display, the first arrow and the second arrow originating at a virtual pivot of the virtual compass.

11. A non-transitory computer-readable storage medium comprising instructions executable on a processor of the electronic device for implementing the method of claim 1.

12. A method of indicating an interference magnetic field at an electronic device comprising:
    displaying a first arrow indicating a direction of magnetic north on a display of the electronic device, the direction of the first arrow corrected to remove interference caused by an interference magnetic field;
    displaying a second arrow indicating a direction of a source of the interference magnetic field on a display of the electronic device; and
    displaying a third arrow representing a vector sum of the first arrow and the second arrow.

13. An electronic device, comprising:
    a magnetometer for generating magnetic north data based on detected magnetic field at a location of the electronic device;
    an accelerometer for generating orientation data based on an orientation of the electronic device;
    a memory for storing corrected magnetic north data and interference direction data, the corrected magnetic north data and the interference direction data calculated using the magnetic north data, the orientation data and Earth's magnetic field data associated with the location of the electronic device, the corrected magnetic north data corrected to remove non-north components of the detected magnetic field caused by an interference magnetic field;
    a display; and
    a processor in communication with the magnetometer, the accelerometer and the display, the processor for rendering a first arrow on the display of the electronic device based on the corrected magnetic north data and for rendering a second arrow on the display of the electronic device based on the interference direction data, the first arrow indicating a direction of magnetic north and the second arrow indicating a direction of a source of the interference magnetic field.

14. An electronic device as claimed in claim 13, comprising a gyroscope for generating further orientation data based on an orientation of the electronic device, the corrected magnetic north data calculated using the further orientation data.

15. An electronic device as claimed in claim 13, wherein the Earth's magnetic field data is determined using the World Magnetic Model (WMM), the location of the electronic device being received from a Global Navigation Satellite System (GNSS) receiver in communication with the processor.

16. An electronic device as claimed in claim 13, wherein the Earth's magnetic field data is determined locally based on previously generated magnetic north data.

17. An electronic device as claimed in claim 13, wherein the first arrow is a magnetic north vector having a length that corresponds to a certainty of a direction of magnetic north.

18. An electronic device as claimed in claim 13, wherein the second arrow is an interference vector having a length that corresponds to a strength of the interference magnetic field.

19. An electronic device as claimed in claim 13, wherein a change in strength of the interference magnetic field is indicated by modifying an appearance of the second arrow on the display.

20. An electronic device as claimed in claim 13, wherein a change in certainty of a direction of magnetic north is indicated by modifying an appearance of the first arrow on the display.

* * * * *